United States Patent
Filippi et al.

(10) Patent No.: US 8,926,909 B2
(45) Date of Patent: Jan. 6, 2015

(54) METHOD FOR MODERNIZING THE SYNTHESIS LOOP OF AN AMMONIA PLANT

(75) Inventors: Ermanno Filippi, Castagnola (CH); Luca Bianchi, Cernobbio (IT)

(73) Assignee: Casale SA (CH)

( * ) Notice: Subject to any disclaimer, the term of this patent is extended or adjusted under 35 U.S.C. 154(b) by 82 days.

(21) Appl. No.: 13/521,007

(22) PCT Filed: Dec. 27, 2010

(86) PCT No.: PCT/EP2010/070767
§ 371 (c)(1),
(2), (4) Date: Jul. 6, 2012

(87) PCT Pub. No.: WO2011/091930
PCT Pub. Date: Aug. 4, 2011

(65) Prior Publication Data
US 2012/0279033 A1    Nov. 8, 2012

(30) Foreign Application Priority Data
Jan. 29, 2010 (EP) .................................. 10152069

(51) Int. Cl.
| | | |
|---|---|---|
| B01J 19/00 | (2006.01) | |
| B01J 19/24 | (2006.01) | |
| B01J 19/32 | (2006.01) | |
| C01C 1/00 | (2006.01) | |
| C01C 1/02 | (2006.01) | |
| C01C 1/04 | (2006.01) | |

(52) U.S. Cl.
CPC ...... C01C 1/0405 (2013.01); *B01J 2219/00006* (2013.01)
USPC ............................. 422/148; 422/129; 436/113

(58) Field of Classification Search
CPC ......... A01N 59/00; A01N 37/16; B01J 19/00; B01J 8/00; B01J 19/24; B01J 19/245; B01J 19/32; B01J 19/325; C01C 1/0405; C01C 1/0482; C01C 1/0411; C01C 1/00; C01C 1/02; C01C 1/04; C01C 1/0476; C01B 3/025; C01B 2203/068; G01N 33/0054; G01N 31/22; H01L 2224/73265; H01L 2224/97; H01L 2924/00014
USPC ................................... 422/129, 148; 436/113
See application file for complete search history.

(56) References Cited

U.S. PATENT DOCUMENTS

| | | | | |
|---|---|---|---|---|
| 4,568,531 | A | * | 2/1986 | van Dijk et al. ............... 423/361 |
| 4,769,220 | A | * | 9/1988 | Zardi ............................. 422/148 |

(Continued)

FOREIGN PATENT DOCUMENTS

EP    0 355 259    A1    2/1990

OTHER PUBLICATIONS

International Preliminary Report on Patentability issued in connection with PCT/EP2010/070767.

(Continued)

*Primary Examiner* — Natasha Young
(74) *Attorney, Agent, or Firm* — Akerman LLP

(57) ABSTRACT

A method for modernizing an ammonia synthesis loop (1) with a first converter (10) and a second converter (11) in series, the first converter (10) comprises a cartridge with one or more catalyst beds, the second converter (11) comprises a catalyst bed in direct contact with said vessel, the method comprising the steps of removing the second converter, and boosting the first converter by replacing the cartridge with a high-efficiency cartridge comprising a plurality of adiabatic catalyst beds and inter-bed heat exchangers, or an isothermal catalyst bed, and by reducing the concentration of inerts in said first converter.

8 Claims, 3 Drawing Sheets

(56) References Cited

U.S. PATENT DOCUMENTS

| | | |
|---|---|---|
| 4,867,959 A | 9/1989 | Grotz |
| 4,963,338 A | 10/1990 | Zardi et al. |
| 6,171,570 B1 * | 1/2001 | Czuppon .................. 423/359 |
| 6,282,880 B1 * | 9/2001 | Wallace et al. .............. 60/780 |
| 6,299,849 B1 | 10/2001 | Pagani et al. |
| 7,314,603 B2 * | 1/2008 | Filippi et al. .................. 422/211 |

OTHER PUBLICATIONS

International Search Report issued in connection with PCT/EP2010/070767.

Nielsen, A., "6.4 Synthesis of Ammonia: Ammonia Catalysis and Manufacture", Ammonia Production Processes, 1996, pp. 221-251.

* cited by examiner

METHOD FOR MODERNIZING THE SYNTHESIS LOOP OF AN AMMONIA PLANT

This application is a national phase of PCT/EP2010/070767, filed Dec. 27, 2010, and claims priority to EP 10152069.0, filed Jan. 29, 2010, the entire contents of both of which are hereby incorporated by reference.

FIELD OF THE INVENTION

The present invention relates to the revamping of ammonia plants. More in detail, the invention relates to a method for revamping an ammonia plant where the ammonia synthesis loop comprises a converter system with a first converter and a second converter, the second converter being adiabatic and operating at a high temperature.

PRIOR ART

A prior art layout of the synthesis loop of an ammonia plant comprises a converter system with two converters in series. The first converter receives the fresh ammonia make-up syngas and comprises an internal cartridge containing one or more catalytic beds, possibly with interbed heat exchangers. The second converter is a much simpler and low cost adiabatic unit, where the catalytic bed is in direct contact with the pressure vessel.

For example, the first converter comprises a cartridge with two radial-flow catalyst beds and an interbed heat exchanger. The second converter is a pressure vessel containing one catalyst bed enclosed in flow panels mounted directly on the inside wall of the vessel, with no cartridge.

A heat exchanger such as a steam superheater is provided between the first and the second converter. The product stream delivered by the first converter is cooled by said heat exchanger, before entering the second converter. Hence, the working temperature of the second converter is controlled mainly by said heat exchanger, and is typically around 350-500° C.

The mass of catalyst of the second converter is comparable to the mass of catalyst of the first converter, which means that the second converter may contain around 50% of the total catalyst of the loop.

Adding the second converter is considered an attractive way to boost the capacity of the loop, and decrease the energy consumption. An example is the S-250 system currently available from Haldor Topsøe. In the past years, some plants have been revamped by adding a second converter to the loop, in accordance with the above.

There are however some drawbacks. The design of the first converter allows adequate cooling of the shell of the pressure vessel, e.g. by circulating the fresh feed syngas, before entering the converter cartridge, in an annular space around the cartridge. The very simple design of the second converter, however, does not allow any effective cooling of the shell. The lack of a shell cooling medium causes the pressure vessel of the second converter to operate constantly at about the same temperature of the catalyst bed, which means over 350° C. and in some cases close to 500° C. The combination of high pressure, high temperature and corrosive environment causes a severe stress to the pressure vessel. In particular, it has been noted that under these conditions the pressure vessel is much more exposed to corrosion due to attack of hydrogen and ammonia. Hydrogen and ammonia corrosion causes brittleness of the steel of the vessel and may lead to formation of stress cracks, especially in weak points such as weldings, and/or in points of the shell where some residual stress is found.

In some cases, serious damages have been observed in the second reactor after some years to an extent that the second reactor was shut down to avoid explosion. In other words, the experience shows that the above layout has a risk of failure of the second reactor.

SUMMARY OF THE INVENTION

The aim of the invention is to provide an effective way of modernizing an ammonia synthesis loop of the above disclosed type, in order to avoid the risk of failure of the second reactor.

This aim is reached with a method for modernizing the ammonia synthesis loop of an ammonia plant, wherein:
  said loop comprises a converter system with at least a first converter and a second converter in series, the second converter receiving a process stream from the first converter,
  said first converter comprises a cartridge with one or more catalyst beds,
  said second converter comprises a pressure vessel and a catalyst bed enclosed in flow distributors associated directly to said vessel,
  a purge rate containing inert gases is taken from the synthesis loop,
the method being characterized in that:
  said second converter is by-passed or removed from the loop;
  the first converter is revamped by at least the step of replacing said cartridge with a high-efficiency cartridge comprising a plurality of adiabatic catalyst beds and interbed heat exchangers, or
  the first converter is revamped by at least the step of replacing said cartridge with a new cartridge comprising an isothermal catalyst bed, and
  the purge rate of the loop is increased.

The invention is based on the very unexpected finding that the combined effect of boosting the first converter with said high-efficiency cartridge, and of increasing the inerts purge from the loop, allows the first reactor alone to give substantially the same conversion rate of the former scheme with two reactors. This was surprising because—as stated above—the second reactor hosts a relevant fraction of the catalyst, namely around 50% of the catalyst of the loop.

The catalyst bed of the second converter is a cartridge-less catalyst bed, for example said catalyst bed is enclosed in flow distribution panels mounted on the inside wall of the pressure vessel of said second converter.

According to first embodiments of the invention, said high-efficiency cartridge preferably comprises a plurality of axial/radial flow or radial-flow catalyst beds with intermediate cooling. For example, said cartridge comprises three axial-radial flow beds and two intermediate heat exchangers between the beds. Examples of applicable high-efficiency cartridges with axial-radial flow can be found in EP 0 202 454, EP 0 297 474, U.S. Pat. No. 4,769,220.

According to second embodiments of the invention, the original cartridge of the first ammonia converter is replaced with a new cartridge comprising an isothermal catalyst bed. The term of isothermal catalyst bed is used to mean that a heat exchanger is immersed in the catalyst bed, to remove heat and keep the temperature of the bed within a given range. The heat exchanger is fed with a suitable heat exchange medium, e.g. boiling water or any other suitable medium. The heat exchanger may be a tube heat exchanger or plate heat exchanger, according to various embodiments of the invention.

Preferably, the purge rate is increased by around 30% to 100%; more preferably by 40% to 80% or more. The purge rate is preferably increased to obtain a concentration of inerts in the first converter less than 10% molar. The purge rate may consist of one purge stream taken from a suitable point in the ammonia synthesis loop; increase of the purge rate may be achieved by increasing the flow rate of said purge stream or addition of further purge stream(s). The purge stream remove from the loop is preferably send to a unit to recover at least partially the hydrogen contained therein.

Usually the pressure vessel of the first container can be maintained. If necessary or appropriate, however, the whole converter may be replaced with a new one. The second converter does not need to be physically removed from the loop, it may be sufficient to by-pass it completely.

The proposed method allows to eliminate the second reactor, which is a source of a possible, dramatic failure of the whole plant, without affecting the performance and, in particular, the concentration of ammonia (% mol) in the product stream at the exit of the synthesis reactor. The method is further advantageous in that the other items of the loop, such as heat exchangers, compressors, etc. . . . need not be modified. In particular, the expensive compression section of the make-up syngas is not affected. The recovery of more hydrogen from the purge stream may involve a little more energy consumption for compression of said hydrogen, this effect being however overcompensated by the advantages of the invention. It should be noted that the invention provides inexpensive and attractive method for making a double-converter ammonia loop more reliable.

These and still further advantages of the invention will be elucidated with the help of the following description of preferred and non-limiting embodiments.

DETAILED DESCRIPTION

Figure 1:
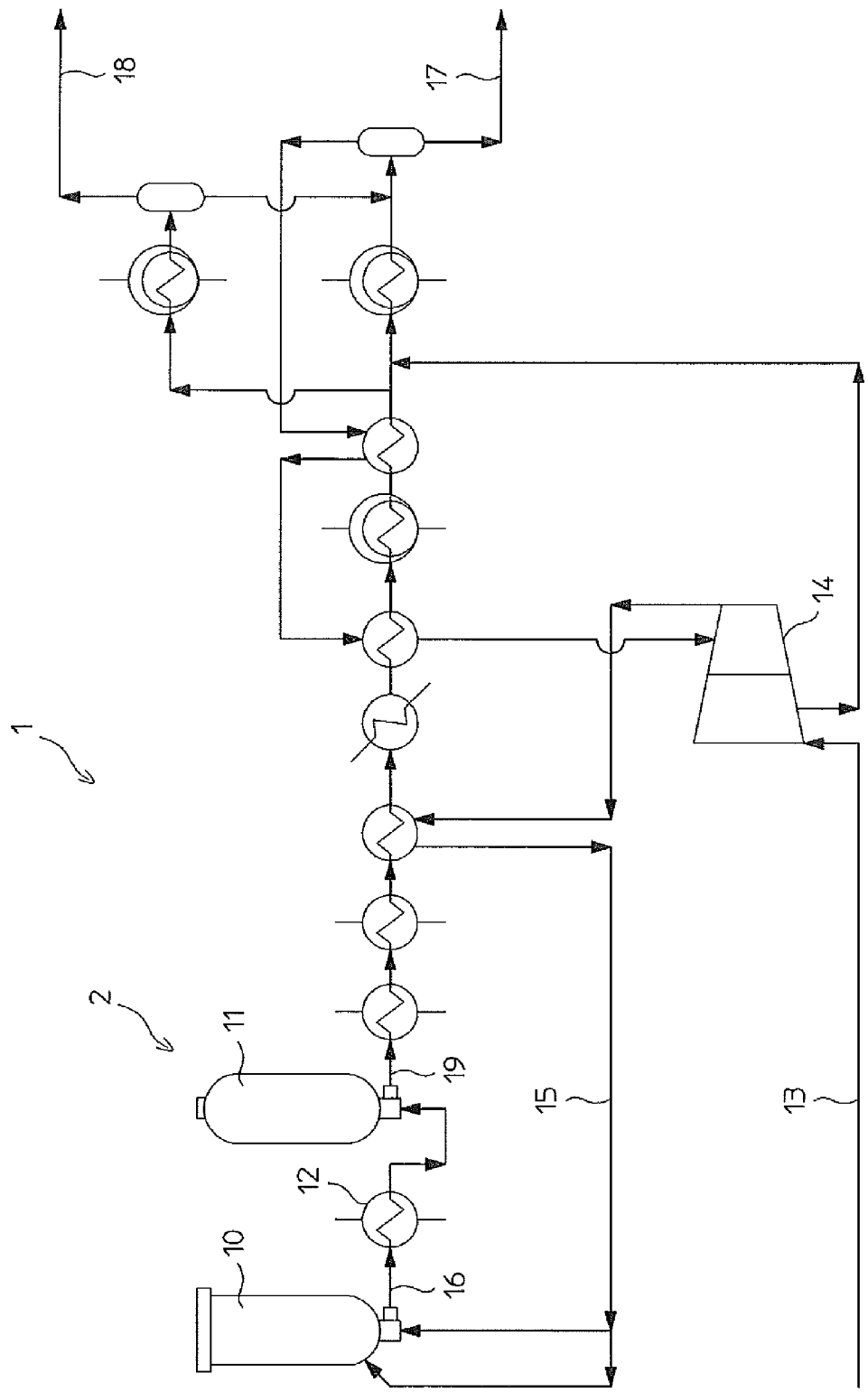
FIG. 1 is a scheme of a known ammonia synthesis loop comprising two ammonia converters.

FIG. 1 is a scheme of an ammonia synthesis loop such as the S-250 system available from Haldor Topsøe. The ammonia synthesis loop 1 comprises a converter system 2 with a first converter 10 and a second converter 11 in series. A superheater (or other types of gas cooler) 12 is provided on the flow line between the converters.

The first converter 10 comprises a cartridge with two radial-flow catalyst beds and an interbed heat exchanger. The first converter 10 may be realized e.g. according to one of the embodiments disclosed in U.S. Pat. No. 4,181,701. The second converter 11 consists of a pressure vessel containing one catalyst bed enclosed in flow panels mounted directly on the inside wall of the vessel.

The make-up syngas 13 is compressed in inter-refrigerated compression section 14 and is fed to the first converter 10, via line 15. The product gas stream 16 delivered by the first reactor 10 is cooled in the steam superheater 12 and fed to the second reactor 11. The product stream 19 from the second reactor 11 is passed through a series of heat exchanger as shown; the loop delivers a product ammonia stream 17.

A purge gas stream 18 is removed from the loop in order to avoid accumulation of inerts in the converters. Said purge gas stream 18 may contain hydrogen, nitrogen and a certain amount of inerts, mainly methane and argon. The hydrogen contained in the purge stream 18 is usually recovered in a hydrogen recovery section. It is common that the hydrogen recovery section operates at a lower pressure than the loop, thus requiring a compressor to feed the recovered hydrogen back to the loop itself.

The temperature of the catalyst bed of the second converter 11 is controlled by the superheater 12 and is usually in the range 350-480° C. Said temperature is also the temperature of the pressure vessel of the converter 11, causing a relevant stress to the vessel, for the above discussed reasons.

The loop of FIG. 1 is known art and hence it is not described in further details.

Figure 2:
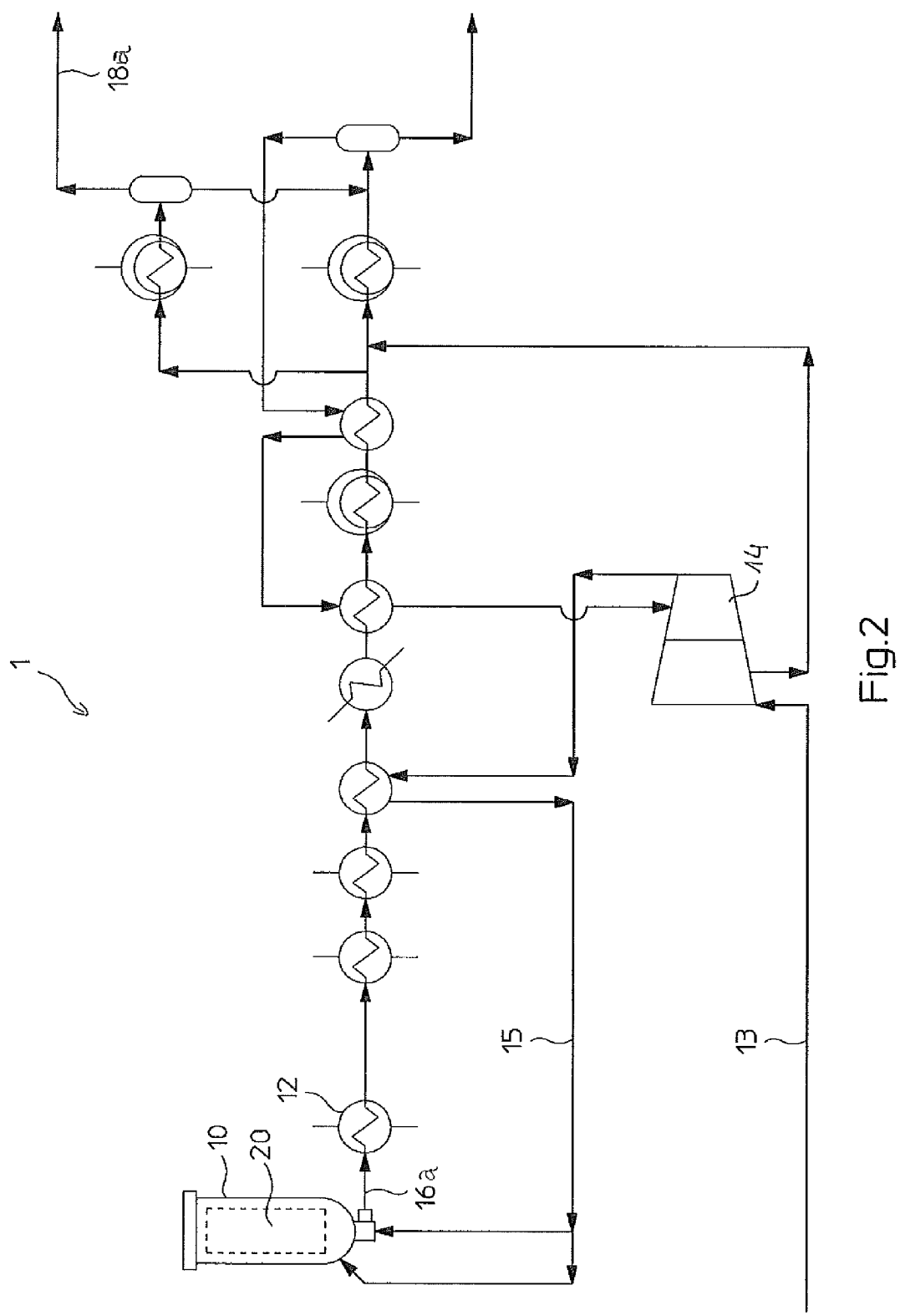
FIG. 2 is a scheme of the loop of FIG. 1 modified in accordance with one embodiment of the invention.

FIG. 2 shows the loop after a modernization according to one of the embodiments of the invention. The first converter 10 is boosted by removing the original cartridge and putting a high-efficiency cartridge 20 such as a three-bed cartridge with two intermediate quench heat exchangers and axial-radial flow. The purge section is boosted so that a purge stream 18a greater than the original stream 18 is taken from the loop. The hydrogen recovery section may be boosted accordingly.

As a rule, the invention does not require any substantial modification of the other main items of the loop. Further and/or minor changes (e.g. piping, auxiliaries, etc. . . . ) may be provided according to the needs.

It has been noted that despite a reduction of around 50% of the available catalyst (due to elimination of the second converter), the NH3 concentration in the product stream 16a at the exit of the boosted converter 10 of the modified loop is substantially the same as the original stream 19 at the exit of the converter 11.

Figure 3:
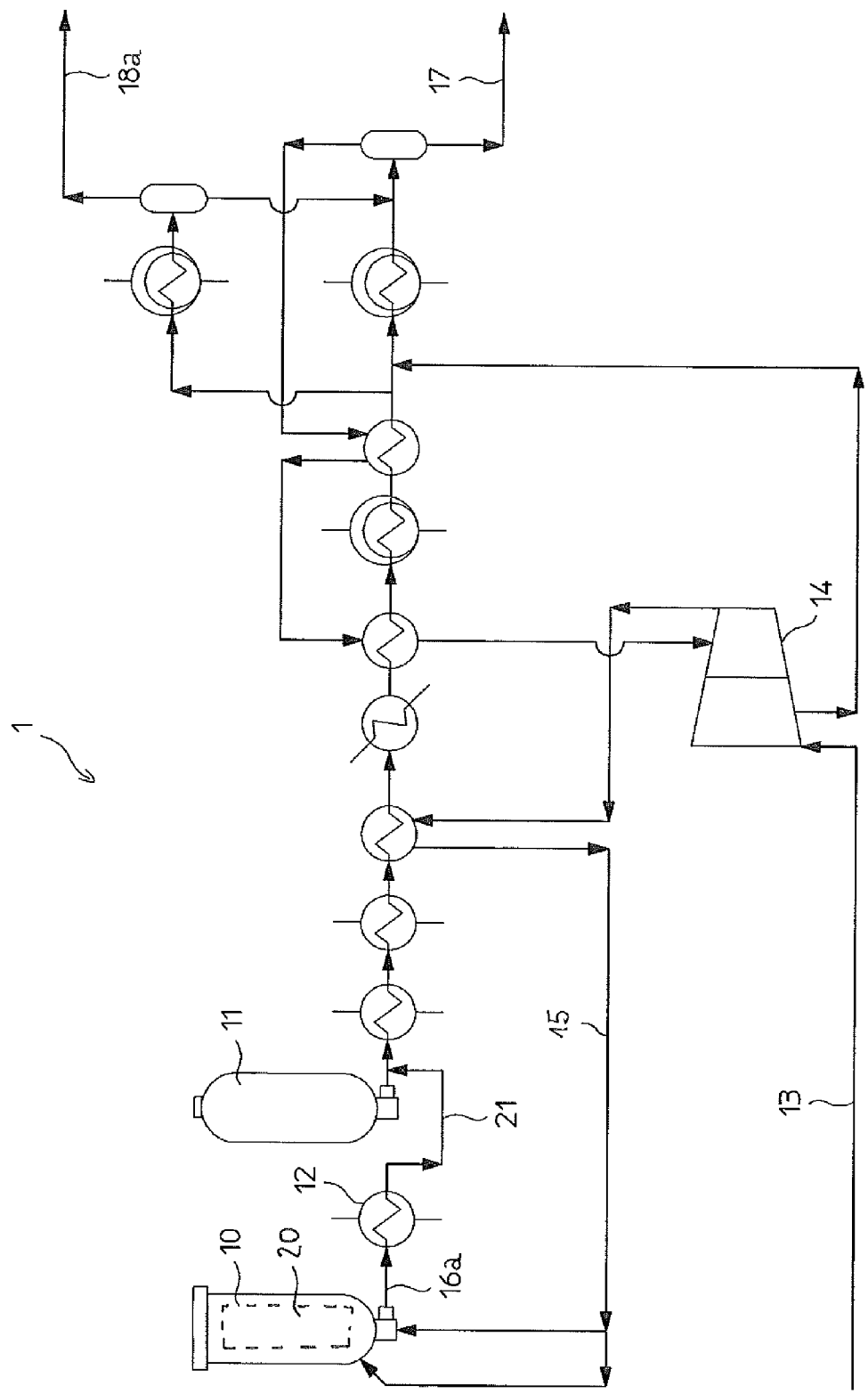
FIG. 3 is a scheme of the loop of FIG. 1 modified in accordance with a further embodiment of the invention.

Referring to FIG. 3, another embodiment is shown where the first converter 10 is boosted with the high-efficiency cartridge 20, and the original converter 11 is by-passed with a flow line 21.

EXAMPLE

The loop of FIG. 1 operates at about 190 bar abs and has a capacity of 1500 MTD (metric tons per day) of ammonia. The converters 10 and 11 contain a total of 190 200 $m^3$ is of an iron based catalyst. The concentration of the ammonia in the stream 19 at the exit of converter 11 is 23.5% (molar). The percentage of inert gases in the first converter 10 is around 13%. After replacing the cartridge with a high-efficiency cartridge with three beds and two quench heat exchangers, and by-passing or removing the second converter 11, the available volume of catalyst drops to 95 $m^3$; it has been noted however that an increase of the purge, to reach around 9% of inert gases in the converter 10, is able to obtain substantially the same 23.5% (molar) of ammonia in the stream 16a at the exit of converter 10.

The invention claimed is:

1. A method for modernizing the ammonia synthesis loop of an ammonia plant, wherein:
    said loop comprises a converter system with at least a first converter and a second converter in series, the second converter receiving a process stream from the first converter,
    said first converter comprises a cartridge with one or more catalyst beds, said second converter comprises a pressure vessel and a catalyst bed enclosed in flow distributors associated directly to said vessel, a purge rate containing inert gases is taken from the synthesis loop, the method comprising the steps of:

removing said second converter from the loop;

revamping the first converter by at least the step of replacing said cartridge with a high-efficiency cartridge comprising a plurality of adiabatic catalyst beds and inter-bed heat exchangers, or revamping the first converter by at least the step of replacing said cartridge with a new cartridge comprising an isothermal catalyst bed, and increasing the purge rate of the loop.

2. The method according to claim 1, where said high-efficiency cartridge comprising a plurality of axial/radial flow or radial-flow catalyst beds with intermediate cooling by a combination of quench and heat exchangers.

3. The method according to claim 2, where said high-efficiency cartridge comprising three axial-radial flow beds with intermediate cooling with two intermediate heat exchangers between the beds.

4. The method according to claim 1, where said new cartridge comprising an isothermal catalyst bed with a heat exchanger immersed in said bed.

5. The method according to claim 4, where said heat exchanger immersed in the bed being a tube or plate heat exchanger.

6. The method according to claim 1, wherein the purge rate containing inerts being increased by at least 30%.

7. The method according to claim 1, wherein the purge rate containing inerts being increased to obtain a concentration of inerts in the first converter less than 10% molar.

8. The method according to claim 1, wherein:

the first converter of the ammonia synthesis loop comprises a cartridge with two radial-flow catalyst beds and an interbed heat exchanger;

the second converter comprises one catalyst bed enclosed in flow panels mounted directly on the inside wall of the vessel of said second converter; and the high efficiency cartridge is a three-bed axial-radial flow cartridge with two intermediate quench heat exchangers between the beds.

* * * * *